(12) United States Patent
Tenghamn

(10) Patent No.: US 7,551,518 B1
(45) Date of Patent: Jun. 23, 2009

(54) DRIVING MEANS FOR ACOUSTIC MARINE VIBRATOR

(75) Inventor: Stig Rune Lennart Tenghamn, Katy, TX (US)

(73) Assignee: PGS Geophysical AS, Lysaker (NO)

( * ) Notice: Subject to any disclaimer, the term of this patent is extended or adjusted under 35 U.S.C. 154(b) by 0 days.

(21) Appl. No.: 12/072,455

(22) Filed: Feb. 26, 2008

(51) Int. Cl.
*H04R 15/00* (2006.01)
*G10K 9/128* (2006.01)

(52) U.S. Cl. .................. 367/168; 367/174; 181/113; 181/120; 310/337

(58) Field of Classification Search .............. 367/168, 367/174; 181/110, 113, 120
See application file for complete search history.

(56) References Cited

U.S. PATENT DOCUMENTS

| | | | |
|---|---|---|---|
| 4,706,230 A * | 11/1987 | Inoue et al. | 367/174 |
| 4,941,202 A * | 7/1990 | Upton | 367/165 |
| 5,329,499 A | 7/1994 | Molund et al. | |
| 5,457,752 A | 10/1995 | Engdahl et al. | |
| 5,546,361 A * | 8/1996 | Boucher et al. | 367/158 |
| 5,757,726 A | 5/1998 | Tenghamn et al. | |
| 5,757,728 A | 5/1998 | Tenghamn et al. | |
| 5,959,939 A | 9/1999 | Tenghamn et al. | |
| 6,041,888 A | 3/2000 | Tenghamn | |
| 6,076,629 A | 6/2000 | Tenghamn | |
| 6,085,862 A | 7/2000 | Tenghamn | |
| 6,711,097 B1 | 3/2004 | Engdahl | |
| 6,851,511 B2 | 2/2005 | Tenghamn | |
| 7,167,412 B2 | 1/2007 | Tenghamn | |

OTHER PUBLICATIONS

R. Tenghamn, "An electrical marine vibrator with a flextensional shell", Dec. 2006, Exploration Geophysics, Bulletin of the Australian Society of Exploration Geophysicists, pp. 286-291, vol. 37, Issue 4.

* cited by examiner

*Primary Examiner*—Ian J Lobo
(74) *Attorney, Agent, or Firm*—E. Eugene Thigpen

(57) ABSTRACT

A marine vibrator that in a particular embodiment includes a substantially elliptically shaped outer shell, a driver having a first and second end, at least one outer spring connected between the first end and the second end of the driver, and at least one inner spring connected between the first end and the second end of the driver. One or more masses are attached to the inner spring. At least one transmission element connects the outer spring and the outer shell. The outer and inner springs and the masses attached to the inner spring are selected to generate a first resonance frequency and a second resonance within the frequency range between 1 Hz and 300 Hz.

6 Claims, 4 Drawing Sheets

DRIVING MEANS FOR ACOUSTIC MARINE VIBRATOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention is related to marine geophysical exploration and in particular to a vibratory source useful in marine geophysical exploration.

2. Background Art

Seismic sources, including vibratory sources, are utilized in geophysical exploration on land and in water covered areas of the earth. Signals generated by these sources travel downwardly into the earth and are reflected from reflecting interfaces in the subsurface and are detected by signal detectors, typically hydrophones or geophones, on or near the earth's surface.

Most of the acoustic sources employed today in marine operations are of the impulsive type, in which efforts are made to generate as much energy as possible during as short a time span as possible. The frequency content of such sources is controllable only to a small degree, and different sources are selected for the generation of different frequency ranges for different surveying needs. Vibratory acoustic sources, including hydraulically powered sources and sources employing piezoelectric or magnetostrictive material, have been used in marine operations. However, such sources have found only limited use. Although such sources can generate signals over various frequency bands, commonly referred to as "frequency sweeps", the limited power that such sources known to the prior art have been able to generate have limited their use in marine operations.

It is well known that as sound waves travel through water and through subsurface geological structures, higher frequency sound waves are attenuated more rapidly than lower frequency sound waves, and consequently, lower frequency sound waves can be transmitted over longer distances through water and geological structures than higher frequency sound waves. There has for a long time been a need in the seismic sector of the oil and gas industry for powerful low frequency marine sound sources.

Accordingly, there is a continuing need for improved acoustic sources for use in marine operations.

SUMMARY OF THE INVENTION

A marine vibrator that in a particular embodiment includes a substantially elliptically shaped outer shell, a driver having a first and second end, at least one outer spring connected between the first end and the second end of the driver, and at least one inner spring connected between the first end and the second end of the driver. One or more masses are attached to the inner spring. At least one transmission element connects the outer spring and the outer shell, which transmits acoustic energy into the water. The outer and inner springs and the masses attached to the inner spring are selected to generate a first resonance frequency and a second resonance frequency within the frequency range between 1 Hz and 300 Hz.

DESCRIPTION OF A PREFERRED EMBODIMENT

The total impedance that will be experienced by a marine vibrator may be expressed as follows:

$$Z_r = R_r + jX_r \qquad (Eq.\ 1)$$

where $Z_r$ is total impedance $R_r$ is radiation impedance, and $X_r$ is reactive impedance In an analysis of the energy transfer of a marine vibrator, the system may be approximated as a baffled piston. In the expression of the total impedance that will be experienced, the radiation impedance $R_r$ of a baffled piston is:

$$R_r = \pi a^2 \rho_0 c R_1(x) \qquad (Eq.\ 2)$$

and the reactive impedance is:

$$X_r = \pi a^2 \rho_0 c X_1(x) \qquad (Eq.\ 3)$$

where $$x = 2ka = \frac{4\pi a}{\lambda} = \frac{2\omega a}{c} \qquad (Eq.\ 4)$$

and where $$R_1(x) = 1 - \frac{2}{x} J_1(x) \text{ and} \qquad (Eq.\ 5)$$

$$X_1(x) = \frac{4}{\pi} \int_0^{\frac{\pi}{2}} \sin(x \cos\alpha) \sin^2\alpha\, d\alpha \qquad (Eq.\ 6)$$

where $\rho_0$=density of water, $\omega$=radial frequency, $k$=wave number, $a$=radius of piston, $c$=sound velocity, $\lambda$=wave length, and $J_1$=Bessel function of the first order Using the Taylor series expansion on the above equations yields $$R_1(x) = \frac{x^2}{2^2 1! 2!} - \frac{x^4}{2^4 2! 3!} + \ldots \qquad (Eq.\ 7)$$

-continued $$X_1(x) = \frac{4}{\pi}\left[\frac{x}{3} - \frac{x^3}{3^2 \cdot 5} + \frac{x^5}{3^2 \cdot 5^2 \cdot 7} - \cdots\right] \quad \text{(Eq. 8)}$$

For low frequencies, when x=2 ka is much smaller than 1, the real and imaginary part of the total impedance expression may be approximated with the first term of the Taylor expansion. The expressions for low frequencies, when the wave length is much larger then the radius of the piston, becomes $$R_1(x) \rightarrow \frac{1}{2}(ka)^2 \quad \text{(Eq. 9)}$$

$$X_1(x) \rightarrow \frac{8ka}{3\pi} \quad \text{(Eq. 10)}$$

It follows that for low frequencies R will be a small number compared to X, which suggests a very low efficiency signal generation. However, by introducing a resonance in the lower end of the frequency spectrum, low frequency acoustic energy may be generated more efficiently. At resonance the imaginary (reactive) part of the impedance is cancelled, and the acoustic source is able to efficiently transmit acoustic energy into the water.

The present invention, in a preferred embodiment, comprises a marine vibrator that displays at least two resonant frequencies within the seismic frequency range of interest, typically a range between 1 Hz and 300 Hz.

Figure 1:
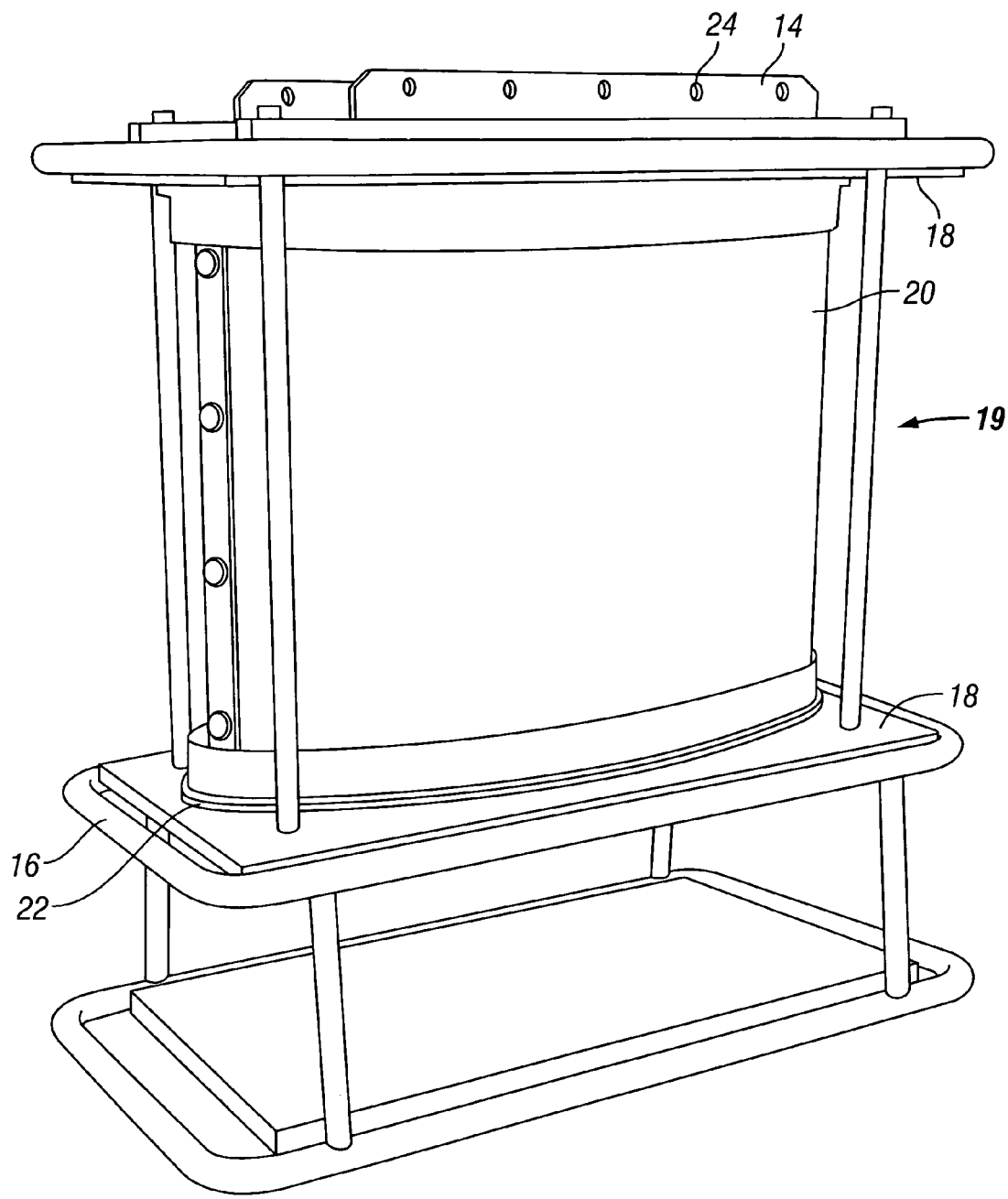
FIG. 1 shows a specific implementation of the invention as it would be deployed for marine operations.

FIG. 1 shows an implementation of a marine vibrator 19, according to a preferred embodiment of the invention, as it would be deployed in marine operations. Marine vibrator 19 comprises vibrator source 20 mounted within frame 16. Bracket 14 is connected to the top of frame 16 and includes apertures 24 which may be utilized for deploying the vibrator into a marine environment. FIG. 1 will be discussed further herein, but for a better understanding of the invention, reference is made to FIGS. 2 to 5.

Figure 2:
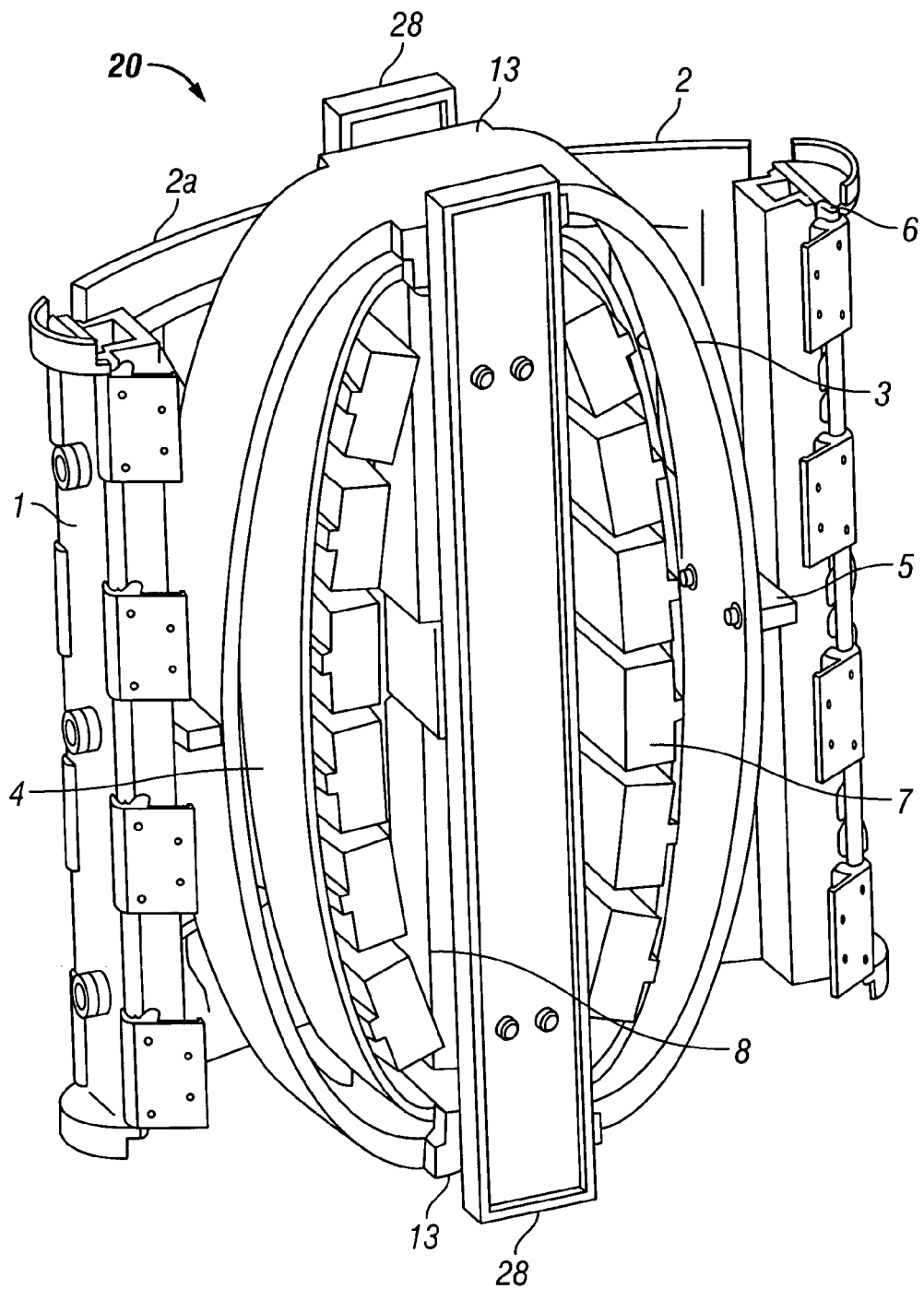
FIG. 2 shows an embodiment of the invention in partial cross-section.

FIG. 2 show an embodiment of the invention in partial cross-section, which includes driver 8, which may be a magnetostrictive driver, and which may preferably be formed from Terfenol-D. Although the particular embodiment of the invention described herein shows only a single driver, an embodiment in which a plurality of drivers are utilized in parallel is within the scope of the invention. The embodiment further includes outer driver spring 3, connected to each end 13 of driver 8. In a particular implementation of the invention, driver spring 3 may have an elliptical shape. In the preferred embodiment in which driver 8 comprises a Terfenol-D driver, driver 8 further comprises magnetic circuitry (not specifically shown) that will generate a magnetic field when electrical current is applied to the magnetic circuitry. The magnetic field will cause the Terfenol-D rods to elongate. By varying the magnitude of the electrical current, and consequently the magnitude of the magnetic field, the length of the driver 8 is varied. Typically, permanent magnets are utilized to apply a bias magnetic field to the Terfenol-D rods and a variation in the magnetic field is generated by applying a varying electrical current to the electrical coils that are formed around the Terfenol-D rods. Variations in the length of the drivers cause a corresponding change in the dimensions of outer driver spring 3.

Also shown in FIG. 2 is inner spring 4, with masses 7 attached thereto. As further discussed below, inner driver spring 4, with masses 7 attached thereto, is included to achieve a second system resonance frequency within the seismic frequency range of interest. Although a vibrator system that included only outer spring 3 would typically display a second resonance frequency, for systems having a size suitable for use in marine geophysical exploration, the second resonance frequency would be much higher than the frequencies within the seismic frequency range of interest.

Mounting brackets 28, shown in FIG. 2, are fixedly connected at the upper and lower ends thereof to upper and lower end plates 18 (shown in FIG. 1). Driver 8 is fixedly connected at a longitudinally central location thereof to the mounting brackets 28, to maintain a stable reference point for driver 8. The movement of the ends 13 of driver rod 8 is unrestricted with reference to mounting brackets 28.

The embodiment of the invention of FIG. 2 further includes an outer shell 2, to which outer spring 3 is connected through transmission elements 5. The form of shell 2 is generally referred to as a flextensional shell. In a particular implementation of the invention, outer shell 2 comprises two side portions that may be mirror images of each other and two end beams 1, with the side portions being hingedly connected to the end beams 1 by hinges 6. FIG. 2 shows one of the side portions of outer shell 2, denoted in FIG. 2 as shell side portion 2a. When fully assembled the second shell side portion (not shown in FIG. 2), comprising substantially a mirror image of shell side portion 2a will be hingedly connected by hinges 6 to end beams 1, to complete a flextensional shell surrounding the assembled driver 8 and outer spring 3 and inner spring 4.

With reference to FIG. 1 marine vibrator 19 further comprises top and bottom end plates 18. The assembled outer shell 2, comprising the two shell side portions and the two end beams 1 are sealingly attached to the top and bottom end plates 18. Although outer shell 2 is sealingly engaged with top and bottom end plates 18, when the marine vibrator 19 is in operation, the outer shell 2 will display movement with respect to the end plates 18, so the connection between the end plates 18 and the outer shell 2 will be a flexible connection, that might be provided, for example, by a flexible membrane 22 (not shown in detail).

Figure 3:
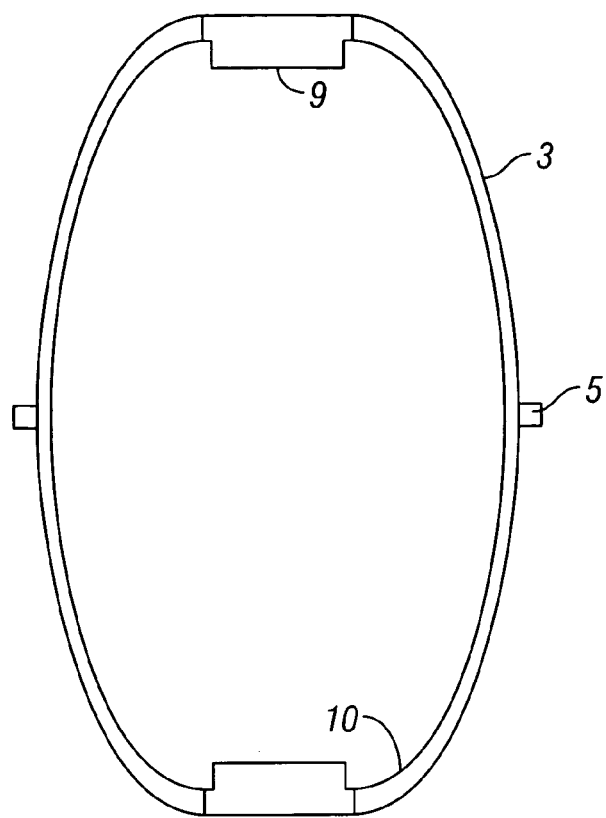
FIG. 3 shows the outer spring of an embodiment of the invention.
Figure 4:
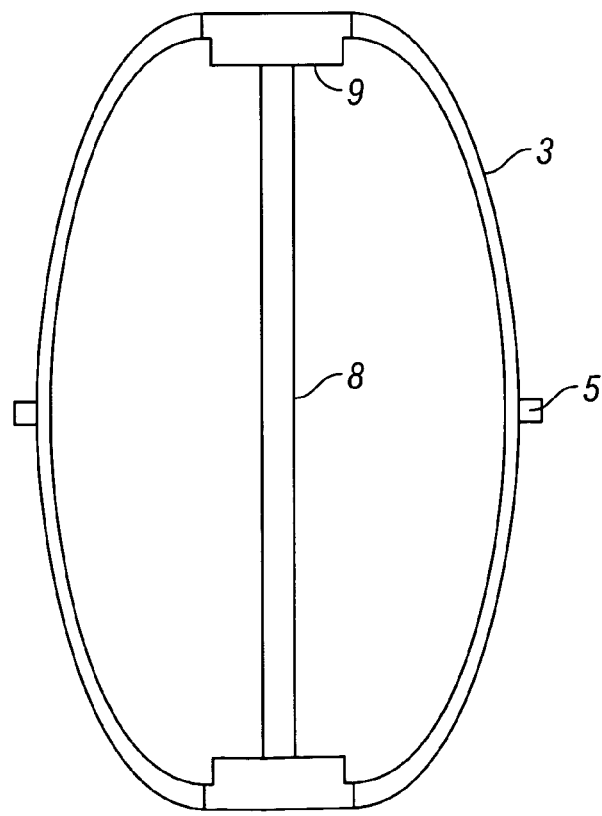
FIG. 4 shows the outer spring in combination with the driver.
Figure 5:
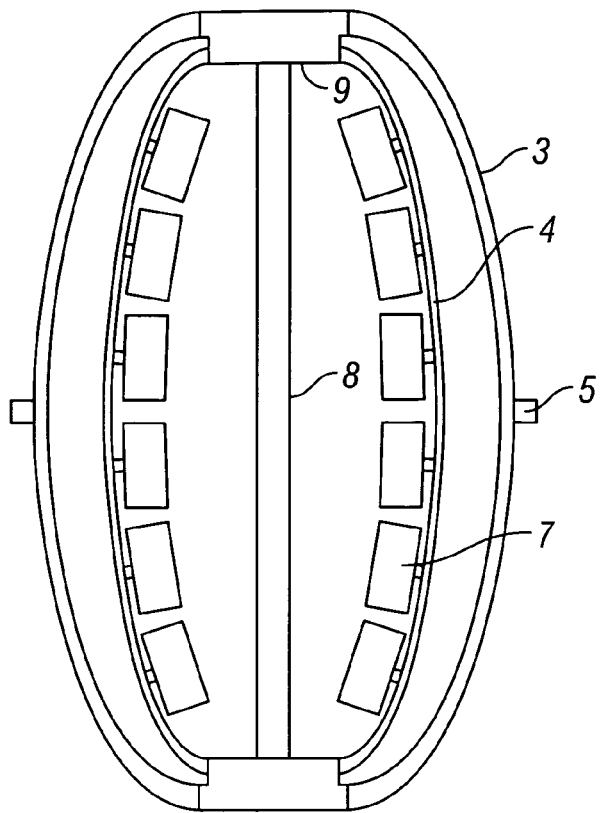
FIG. 5 shows the outer spring in combination with the driver, in combination with an inner spring with added mass.

Additional details of a particular implementation of the invention are shown in FIGS. 3, 4 and 5. FIG. 3 shows the outer driver spring 3. This spring has two functions. One is to transform changes in the length of the magnetostrictive driver 8 into movement of the outer shell 2. The second function is to form a resonant system for more efficiently generating acoustic energy in a marine environment. As the length of driver 8 is shortened, the center portion of driver spring 3 will move outwardly from driver 8, and as driver 8 is lengthened, the center part of driver spring 3 will move inwardly toward driver 8. This movement of the center part of outer spring 3 is transferred to outer shell 2, by mean of transmission elements 5. The movement of the outer shell will thereby be enhanced with respect to the movement of the driver, with the amount of the enhancement, normally referred to as the "transformation factor", determined by the radius 10 of the elliptical driver spring 3. The value of the transformation factor typically varies from 2 to 5, depending on the radius of the elliptical spring. If larger amplitudes with less force are desired, a larger transformation factor is selected. The two sections of driver spring 3 are interconnected by driver plates 9, which form the upper and lower end 13 of the driver 8, when the vibrator 20 is assembled.

FIG. 4 shows the outer driver spring 3 with the driver 8. FIG. 4 shows driver spring 3 connected to driver 8 through a driver plate 9, which is affixed to each end of driver 8. The characteristics of outer driver spring 3, driver 8 and outer shell 2 substantially determine the first resonance frequency. By selecting the spring constant of driver spring 3 a resonance frequency can be achieved at the desired frequency within a seismic frequency range of interest.

FIG. 5 shows the marine vibrator apparatus with inner driver spring 4 with masses 7 attached thereto. This inner driver spring 4 with masses 7 attached thereto will interact with driver 8 to determine a second resonance frequency. By selecting the spring constant of inner driver spring 4 and the mass of masses 7 a second resonance frequency can be achieved at a desired frequency within the seismic frequency range of interest. This second resonance will boost the acoustic output of the marine vibrator and generate a nearly flat amplitude spectrum between the first and second resonance. Outer spring 3 and inner spring 4 may each be formed from steel, glass fiber, carbon fiber or other suitable flexible material.

Figure 6:
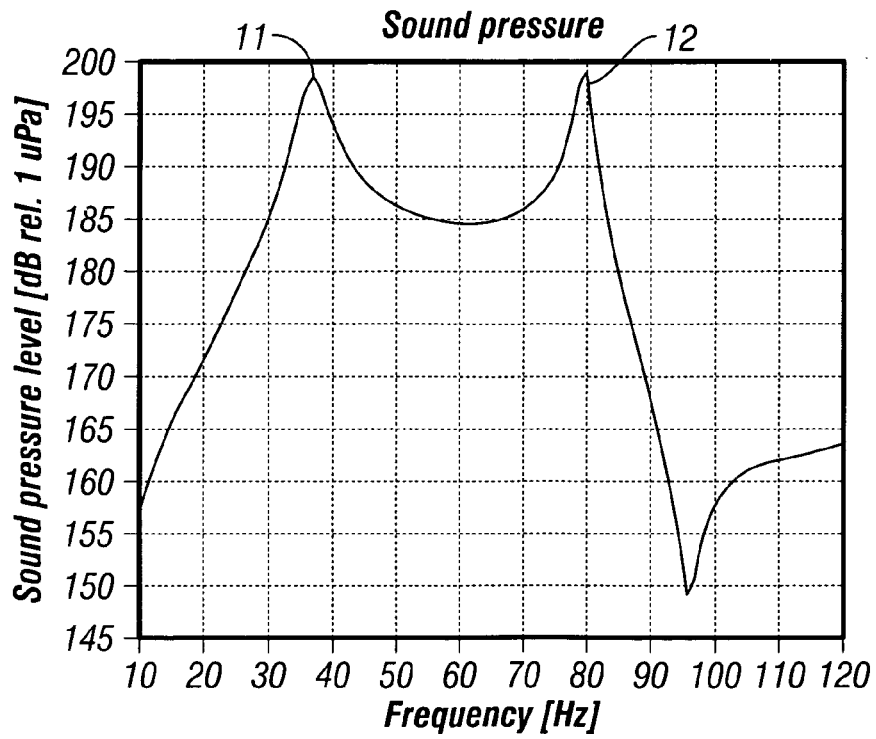
FIG. 6 shows a simulated amplitude spectrum with two resonances.

FIG. 6 shows the results from a finite element simulation of a marine vibrator according to a preferred embodiment of the invention. The first resonance frequency 11 results substantially from interaction of the outer driver spring 3, the driver 8 with the outer shell 2. The second resonance frequency 12 results substantially from the interaction of the inner driver spring 4 with its added masses 7 and the driver 8.

In constructing any specific implementation of the invention, finite element analysis may be utilized as known to those of ordinary skill in the art. In any such analysis, the following principles of operation are relevant. If outer shell 2 is approximated as a piston, then, for low frequencies, the mass load, or the equivalent fluid mass acting on the shell is:

$$M = \rho_0 \frac{8a^3}{3} \quad \text{(Eq. 11)}$$

where,

M is mass load, $\rho_0$ is density of water, and a is the equivalent radius for a piston which corresponds to the size of outer shell 2.

The outer shell 2 has a transformation factor $T_{shell}$ between the long and short axis of its ellipse, so that the deflection of the two shell side portions (side portion 2a in FIG. 2 and its mirror image on the other side of outer shell 2) will have a higher amplitude than the deflection of end beams 1 (which interconnects the two side portions of shell 2) caused by movement of transmission elements 5. Further, the outer spring 3 creates a larger mass load on the driver 8 since the outer spring 3 also has a transformation factor between the long axis and short axis of its ellipse, with the long axis being substantially the length of the drive 8 and the short axis being the width of the elliptically shaped spring. Referring to this transformation factor as $T_{spring}$, the mass load on the drive 8 will be $$M_{driver} = (T_{shell})^2 \cdot (T_{spring})^2 \cdot \rho_0 \frac{8a^3}{3} \quad \text{(Eq. 12)}$$

The first resonance, $f_{resonance}$, for the acoustic emitter will be substantially determined by the following mass spring relationship:

$$f_{resonance} = \frac{1}{2\pi} \sqrt{\frac{K}{M_{driver}}} \quad \text{(Eq. 13)}$$

where:

K=spring constant, and $M_{outer}$=mass load on the drive 8.

K represents the spring constant for the outer spring 3 combined with the drive 8, where the outer spring 3 is connected to the outer shell 2, through the transmission elements 5, end beam 1 and hinges 6.

To achieve efficient energy transmission with the seismic frequency range of interest, it is important to achieve a second resonance frequency within the seismic frequency range of interest. In the absence of the inner spring, the second resonance frequency would occur when the outer driver spring 3, acting together with driver 8, has its second Eigen-mode. This resonance frequency, however, is normally much higher than the first resonance frequency, and accordingly, would be outside the seismic frequency range of interest. As is evident from the foregoing equation, the resonant frequency will be reduced if the mass load on outer spring 3 is increased. This mass load could be increased by adding mass to driver 8, however, in order to add sufficient mass to achieve a second resonance frequency within the seismic frequency range of interest, the amount of mass that would need to be added to the driver would make such a system impractical for use in marine seismic operations.

In accordance with the present invention, a second spring, the inner driver spring 4, is included inside the outer driver spring 3 with added masses 7 on the side of the inner spring 3. The effect of such added mass is equivalent to adding mass in the end of the driver 8.

$$M_{inner} = (T_{inner})^2 \cdot M_{added} \quad \text{(Eq. 14)}$$

The extra spring, the inner driver spring 4, will have a transformation factor $T_{inner}$ as well and will add to the mass load on the Terfenol driver 8. Use of the inner spring 4, with the added mass 4, allows the second resonance of the system to be tuned so that the second resonance with in the seismic frequency range of interest, thereby improving the efficiency of the acoustic emitter in the seismic band.

$$f_{resonance\,2} = \frac{1}{2\pi} \sqrt{\frac{K_{inner} + K_{driver}}{(T_{inner})^2 \cdot M_{added}}} \quad \text{(Eq. 15)}$$

Where $K_{inner}$=spring constant of inner spring $K_{driver}$=spring constant of outer driver assembly.

Not only will the invention create two resonances in the frequencies of interest, it will also make it possible to create large amplitudes for this type of acoustic transmitters.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

I claim:

1. A marine seismic vibrator comprising:
   a substantially elliptically shaped outer shell;
   a driver having a first and second end;
   at least one outer spring connected between the first end and the second end of said driver;
   at least one inner spring connected between the first end and the second end of said driver, said inner spring having one or more masses attached thereto;
   at least one transmission element connecting the outer spring with said outer shell; and
   wherein said springs and said masses are selected to generate a first resonance frequency and a second resonance frequency within a frequency range between 1 Hz and 300 Hz.

2. The apparatus of claim 1 wherein said driver comprises a magnetostrictive driver.

3. The apparatus of claim 2 wherein said magnetostrictive driver comprises Terfenol-D.

4. The apparatus of claim 1 wherein the outer spring together with the driver and the outer shell determine a first resonance frequency of the marine vibrator.

5. The apparatus of claim 4 wherein the inner spring and the masses attached thereto and said driver determine a second resonance frequency of the marine vibrator.

6. The apparatus of claim 1 wherein said outer shell is a flextensional shell.

* * * * *